Oct. 17, 1967  A. WOODS  3,347,030
TOBACCO HARVESTING MACHINE
Filed Dec. 1, 1964  5 Sheets-Sheet 1

Allen Woods
INVENTOR.

Oct. 17, 1967  A. WOODS  3,347,030
TOBACCO HARVESTING MACHINE
Filed Dec. 1, 1964  5 Sheets-Sheet 2

Allen Woods
INVENTOR.

Allen Woods
INVENTOR.

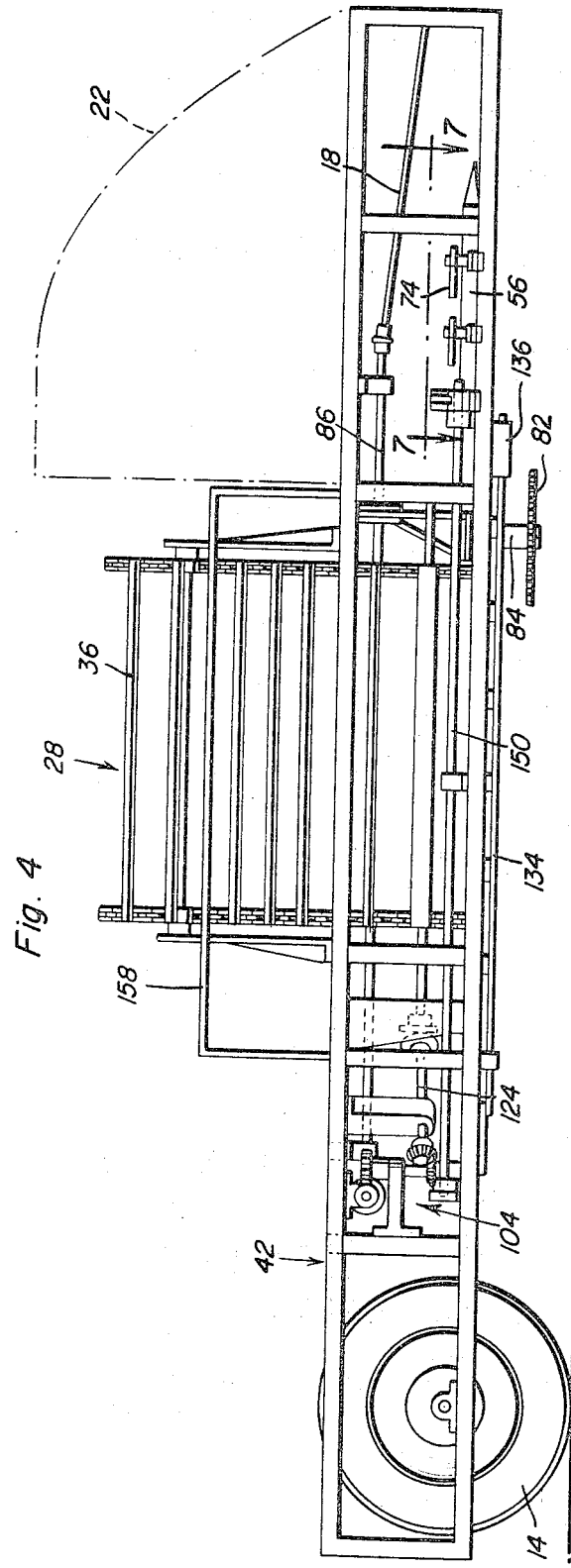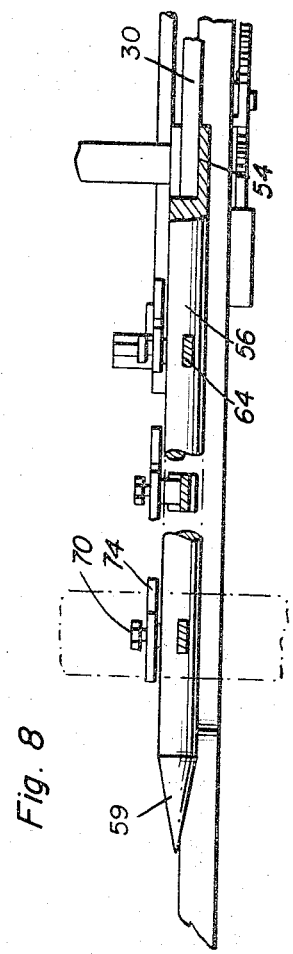
Allen Woods
INVENTOR.

Oct. 17, 1967
A. WOODS
3,347,030
TOBACCO HARVESTING MACHINE
Filed Dec. 1, 1964
5 Sheets-Sheet 5
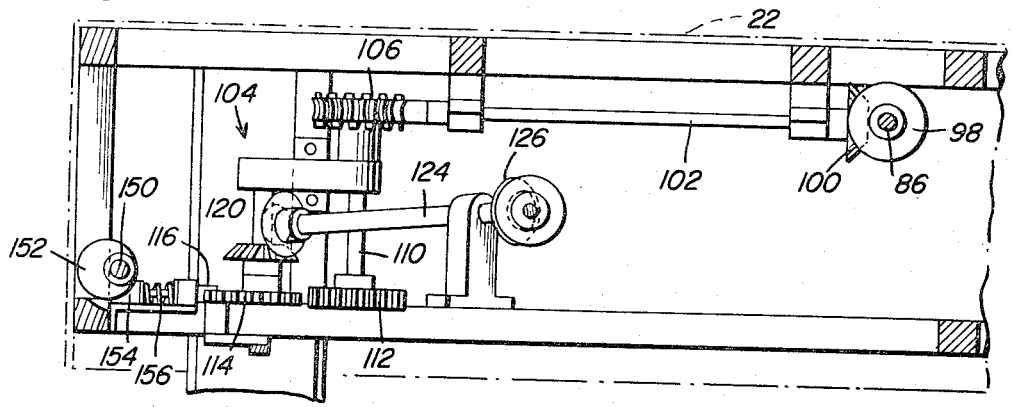
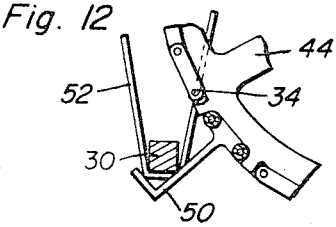
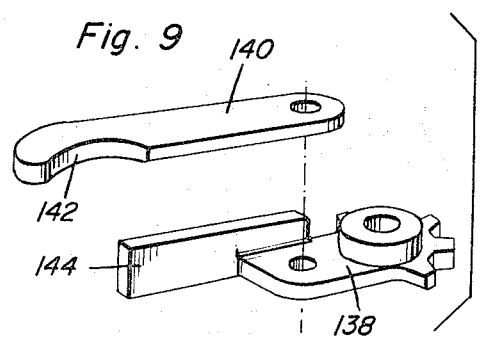
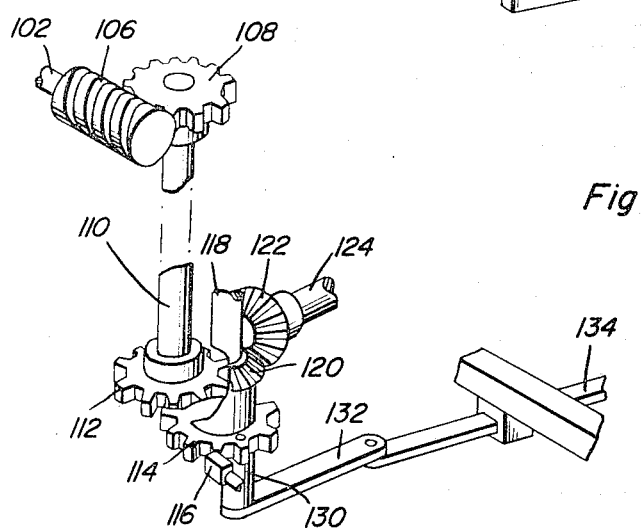
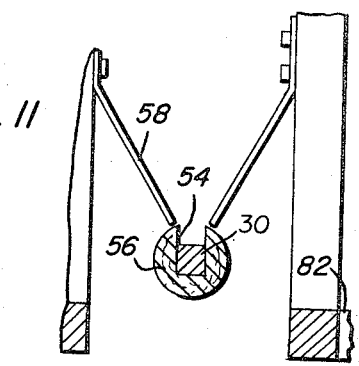
Allen Woods
INVENTOR.
BY *Clarence A. O'Brien*
and *Harvey B. Jacobson*
Attorneys

United States Patent Office 3,347,030
Patented Oct. 17, 1967

3,347,030
TOBACCO HARVESTING MACHINE
Allen Woods, Lexington, Ky., assignor of forty-nine percent to Manuel Osborne, Lexington, Ky.
Filed Dec. 1, 1964, Ser. No. 415,037
13 Claims. (Cl. 56—27.5)

ABSTRACT OF THE DISCLOSURE

Plant stalks are impaled on a spear held by a plurality of sequentially retracted cam devices. As the plant stalks are transferred from the spear to a holder stick during forward movement of the harvester, they are cut below the spear and subsequently spaced along the stick by spacing fingers synchronized with movement of the harvester. Loaded sticks are withdrawn from the spear by a conveyor.

---

This invention relates to a new and useful machine for harvesting crops such as tobacco plants.

In connection with the harvesting of tobacco plants, the stalks of the plants growing in a row are cut and impaled upon a stalk holder stick so that a plurality of tobacco plants may be stored after harvesting in spaced relation on each stick. It is therefore a primary object of the present invention to automatically cut and impale a plurality of such tobacco plants on holder sticks which when fully loaded are removed from the position in which they are placed, for receiving the plants.

An additional object of the present invention is to provide a harvesting machine for tobacco plants or the like which features a novel stalk piercing device by means of which the plants are transferred to the stalk holder stick.

A further object of the present invention is to provide a tobacco harvesting machine wherein the plants' stalks are accurately spaced on a holder stick by a spacing mechanism which is rendered operative to space the plants in accordance with the rate at which the plants are actually received within the harvesting machine.

A still further object of the present invention is to provide a tobacco harvesting machine in which the plants are intermittently displaced along a stalk holder for spacing thereof and is provided with a novel synchronizing mechanism for controlling the spacing of the plants as well as facilities for removing a fully loaded stalk holder from its position receiving the plants.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a side elevational view of the harvesting machine with the housing removed.

FIGURE 5 is a sectional view taken substantially through a plane indicated by section line 5—5 in FIGURE 3.

FIGURE 6 is a partial sectional view taken substantially through a plane indicated by section line 6—6 in FIGURE 3.

FIGURE 8 is a partial sectional view taken substantially through a plane indicated by section line 8—8 in FIGURE 7.

FIGURE 9 is a prespective view of certain disassembled parts of the spacing mechanism associated with the tobacco harvesting machine.

FIGURE 10 is a perspective view of a portion of the drive gearing associated with the harvesting machine.

FIGURE 11 is a partial sectional view taken substantially through a plane indicated by section line 11—11 in FIGURE 3.

FIGURE 12 is a partial sectional view taken substantially through a plane indicated by section line 12—12 in FIGURE 3.

Figure 1:
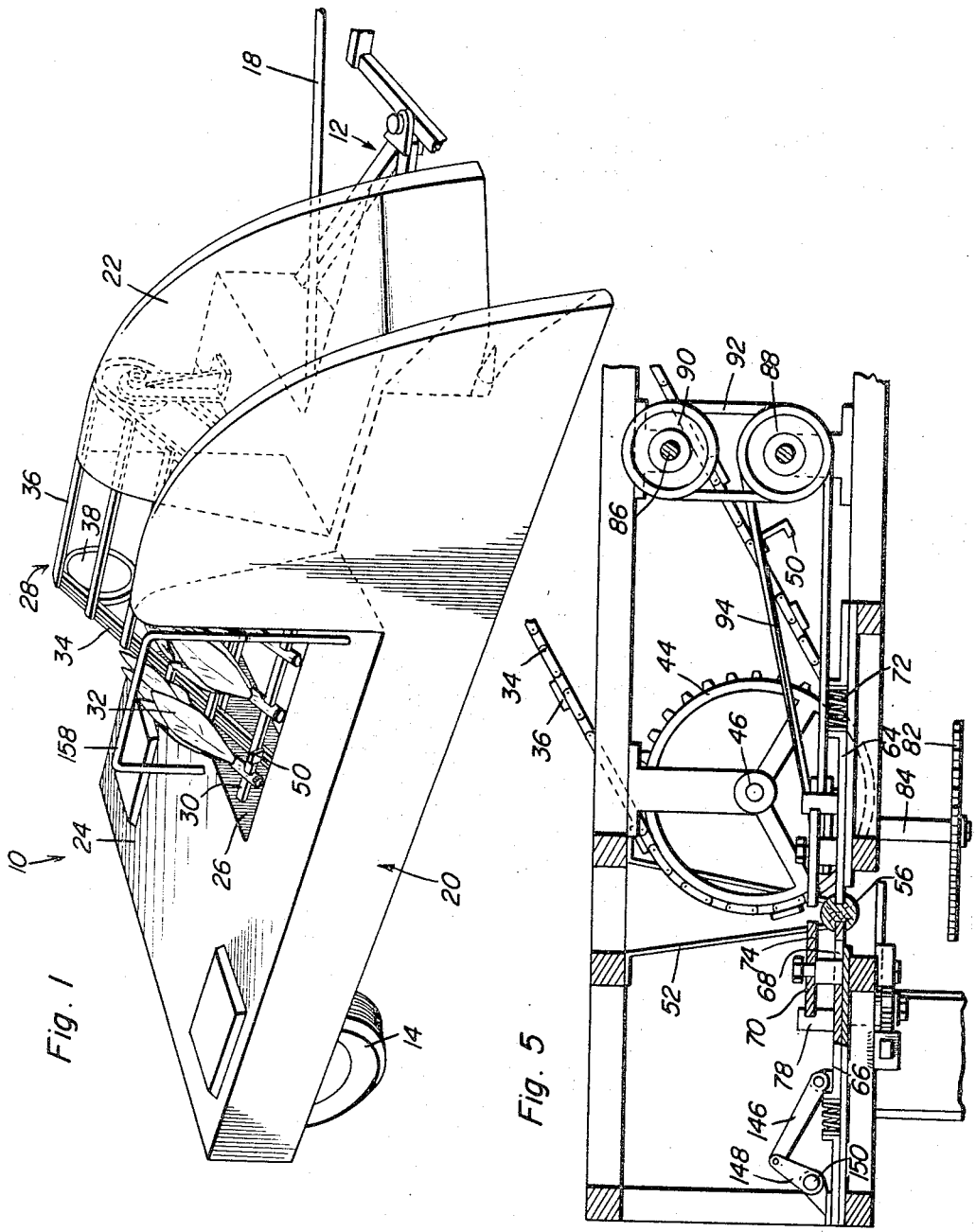
FIGURE 1 is a perspective view of the tobacco harvesting machine.
Figure 2:
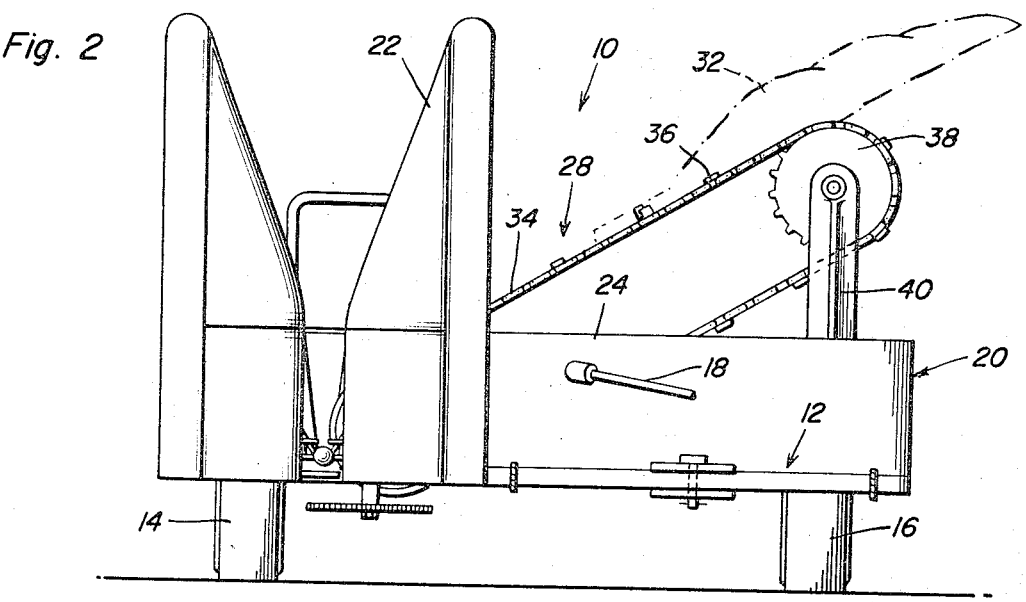
FIGURE 2 is a front elevational view of the harvesting machine shown in FIGURE 1.

Referring now to the drawings in detail, FIGURES 1 and 2 illustrate a complete tobacco harvesting machine generally referred to by reference numeral 10 which is adapted to be towed rearwardly by a towing tractor or vehicle (not shown) in a direction parallel to a row of tobacco plants. Accordingly, the harvesting machine 10 is provided with a hitch 12 by means of which the towing vehicle is connected thereto, the machine being supported in spaced relation above the ground by a pair of rearwardly disposed supporting wheels 14 and 16. Power for operating the harvesting machine is supplied from a power take-off on the towing vehicle (not shown), the power being transmitted by a universal connecting shaft 18 which extends rearwardly from the towing vehicle. The harvesting machine is protectively enclosed by an outer housing or body generally referred to by reference numeral 20 which includes a pair of throat forming guide portions 22 at the forward end portion of the machine between which the vertical stalks of the tobacco plants are received as the machine is moved forwardly parallel to the row of plants. Extending rearwardly from the guide portions 22 and laterally to one side thereof, is a horizontal platform portion 24, the hitch 12 and universal drive shaft 18 extending forwardly from the portion of the housing which projects laterally to one side of the guide portions 22. An opening 26 is formed in the platform 24 rearwardly of the forward guide portions 22 through which an upwardly inclined conveyor assembly 28 extends, the conveyor assembly being adapted to upwardly carry stalk holder sticks 30 when fully loaded with tobacco plants 32 in order to discharge such loaded holder sticks to one lateral side of the harvesting machine. The conveyor assembly is therefore formed by a pair of sprocket chains 34 interconnected by slats 36, the sprocket chains being entrained about idler sprocket wheels 38 at the upper end of the conveyor assembly, the idler sprocket wheels 38 being rotatably mounted on the platform 24 by a pair of journal brackets 40.

Figure 3:
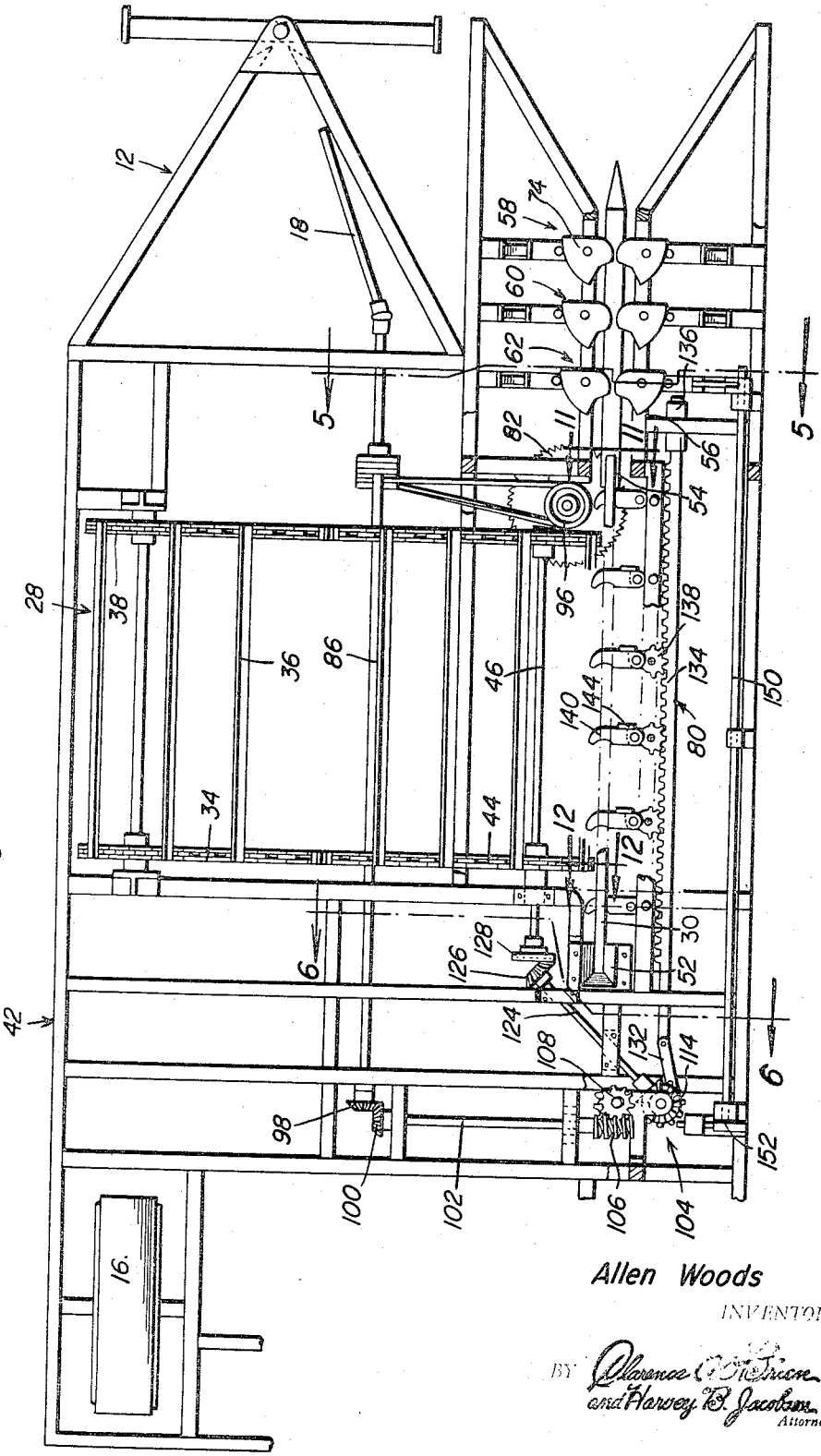
FIGURE 3 is a top plan view of the harvesting machine with the housing removed.

Referring now to FIGURES 3 and 4 in particular, it will be observed that the hitch assembly 12 is connected to a supporting frame assembly 42 by means of which the working parts of the harvesting machine are mounted and on which the body 20 is supported. The conveyor assembly which extends at an upward incline through the opening 26 in the body, is accordingly supported at its lower end by the frame assembly which rotatably mounts a pair of drive sprockets 44 about which the sprocket chains 34 are entrained. The frame assembly therefore rotatably mounts a drive sprocket shaft 46 to which the drive sprockets 44 are connected, the drive sprockets being thereby positioned in close spaced adjacency to a stalk holder stick 30 when operatively positioned in the harvesting machine. In this manner, a pair of lifting hooks 50 secured to the sprocket chains 34 as more clearly seen in FIGURE 12, may lift a loaded stick 30 from its operative position in which it receives the plants' stalks in order to upwardly convey the loaded stick to the upper discharge end of the conveyor assembly as aforementioned. After a plant carrying stick is removed by the conveyor assembly, a new and empty stick may be installed in its place by an operator on the platform 24.

Exposed through the opening 26 in the platform, is a downwardly tapered receiving cup member 52 secured to the frame assembly as shown in FIGURE 3 so as to receive the rear end portion of the stalk holder stick 30. The forward end portion of the stick 30, on the other hand, is received in a cut-out portion 54 formed in the rear end portion of a spear member 56. A pair of spring guide elements 58 may therefore extend from the guide portions 22 of the body as shown in FIGURE 11 in order to guide the forward end portion of the stick 48 into the cut-out 54. Accordingly, the operator may easily drop an empty stick into its operative position for receiving the stalks of tobacco plants precedingly impaled on the spear member 56.

Figure 7:
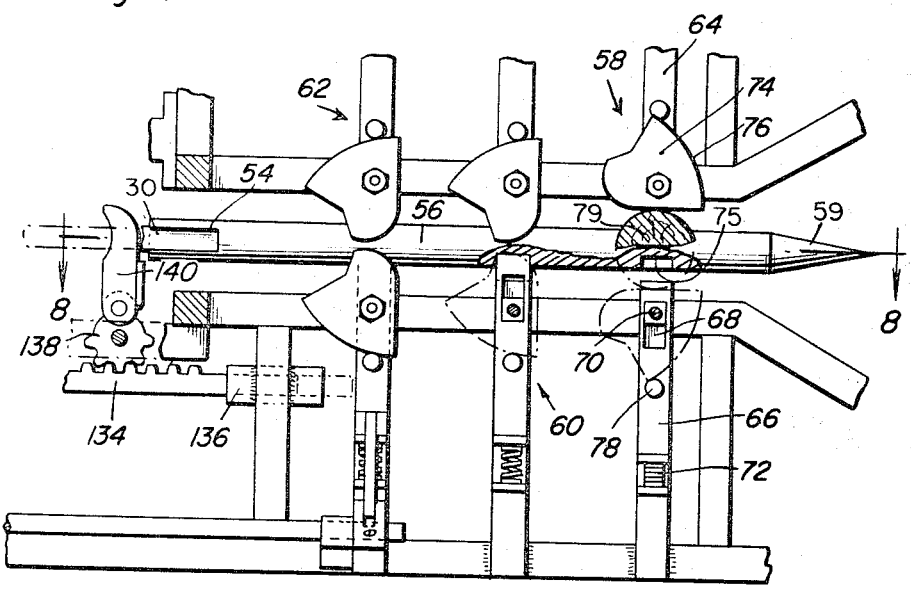
FIGURE 7 is an enlarged sectional view taken substantially through a plane indicated by section line 7—7 in FIGURE 4.

As more clearly seen in FIGURES 7 and 8, the spear member has a pointed forward end 59 and is fixedly held in position in the frame assembly for impaling the stalks of plants guidingly directed between the guide portions 22 of the body as the harvesting machine moves forwardly. Three retractible devices 58, 60 and 62 are operatively mounted by the frame assembly so as to firmly hold the spear member 56 in position and yet permit passage of each plant stalk along the spear member toward the stalk holder stick 30 as the harvesting machine moves forwardly. With continued reference to FIGURES 3, 7, 8 and 5, it will be observed that each of the retractible devices includes a pair of laterally extending holder bars 64 and 66. Each of the holder bars is provided with a guide slot 68 through which a frame mounted guide pin 70 extends for constraining the holder bar to sliding movement in a lateral direction relative to the spear member 56 against the bias of a spring element 72. The locking holder bars are received within notches 73 formed on opposite lateral sides of the spear member 56 in alignment with each of the retractible devices. Each of the retractible devices is also provided with a pair of cam members 74 pivotally mounted by the pins 70 aforementioned which extend through the guide slots 68 in the holder bars. The cam members are provided with cam contours 76 engaged with follower projections 78 which extend upwardly from the holder bars 64 and 66 so that pivotal displacement of the cam members by a plant stalk 79 for example as shown in FIGURE 7 will slidably displace the holder bars 64 and 66 against the bias of the spring element 72 away from the spear member as the stalk is passing between the cam members 74 of the retractible holder device 58. It will therefore be apparent, that as the plant stalks are impaled on the spear member they may pass rearwardly thereon without obstruction by the retractible devices with at least one of the retractible devices being engaged with the spear member at any time in order to firmly hold the spear member in position at all times, this being essential in order to effectively impale the plant stalks. Thus, after a plant stalk passes the rearwardmost retractible device 62, it will move on to the holder stick 30 seated in the cut-out portion 54 of the spear member and extending rearwardly therefrom. After passing on to the holder stick 30, the stalks are intermittently displaced therealong by means of a spacing mechanism generally referred to by reference numeral 80 while at the same time, the bottom portion of the stalk is severed by means of a rotatable saw blade 82 rotatably mounted by the spindle 84 in spaced relation below the forward end portion of the stick 30 as more clearly seen in FIGURE 3.

The saw blade 82 is continuously driven by power supplied through the universal connecting shaft 18. Accordingly, the frame assembly 42 rotatably mounts a drive shaft 86 as shown in FIGURE 3 which is vertically spaced above a continuously driven pulley wheel 88 as shown in FIGURE 5. A drive pulley 90 is connected to the drive shaft 86 vertically aligned above the driven pulley 88 so as to be drivingly connected thereto by the endless belt 92. The driven pulley 88 is in turn drivingly connected by the endless belt 94 to the pulley wheel 96 connected by the drive spindle 84 to the saw blade 82 in order to impart continuous rotation to the saw blade as aforementioned. The drive shaft 86 is also drivingly connected through bevel gears 98 and 100 to the input shaft 102 of an intermittent gear assembly generally referred to by reference numeral 104 through which drive is imparted to the spacing mechanism 80 and the conveyor assembly 28.

Referring now to FIGURES 3, 6 and 10, it will be observed that the input shaft 102 is drivingly connected by the worm gear 106 to a worm wheel 108 secured to the upper end of shaft 110. Connected to the lower end of the shaft 110 is a gear member 112 disposed in meshing relationship to a mutilated gear member 114 having the gear teeth on a circumferential portion thereof removed so that continuous rotation of the gear member 112 will impart limited rotation to the mutilated gear member 114 after which rotation of the mutilated gear member 114 stops until it is angularly displaced by means of a pawl element 116 in order to bring a tooth into meshing engagement with the teeth on the gear member 112. The mutilated gear member 114 is connected by the shaft 118 to a bevel gear 120 which in turn is enmeshed with a bevel gear 122 to which shaft 124 is connected. The shaft 124 extends forwardly at an angle to the longitudinal axis of the frame assembly in order to impart intermittent movement to the conveyor assembly. Accordingly, the forward end of the shaft 124 is connected to a bevel gear 126 enmeshed with bevel gear 128 to which the sprocket drive shaft 46 is connected. Intermittent movement is also imparted by the mutilated gear member 114 to the spacing mechanism 80 by means of an eccentrically connected pin 130 and the connecting link 132.

Referring now to FIGURES 3, 7, 9 and 10, it will be observed that the connecting link 132 is pivotally connected to the rearward end of an elongated rack member 134 slidably mounted by the frame assembly in any suitable fashion including a sliding guide element 136 receiving the forward end portion of the rack member. The rack member is enmeshed with a plurality of spaced sector gear elements 138, six of them being shown in the illustrated embodiment of the invention. Pivotally connected to each of the sector gear elements 138, is a stalk spacing arm 140 having a notch portion 142 adapted to engage the forward side of a stalk being spaced along the holder stick 30. The spacing arm 140 is however limited in its pivotal movement relative to the sector gear in one direction only, by means of a limit stop projection 144 formed on the sector gear element for abutment with the side of the spacing arm 140 opposite the stalk engaging notch 142. It will therefore be apparent, that movement of the rack member 134 in a forward direction as viewed in FIGURE 3 will impart counterclockwise rotation to the sector gear elements 138 and in this direction of rotation, the spacing arms 140 abutting the limit stops 144 will be rendered rigid with the sector gear elements in order to impart spacing movement to the stalks in a rearward direction along the stick 30. When the rack is displaced in a leftward direction on the other hand, the sector gear elements 138 will rotate in a clockwise direction and the spacing arms 140 will pivot relative thereto causing them to be retracted from the stalks previously displaced so that subsequent displacement of the rack in a right-hand direction will bring the spacing arms into positions for engagement with the stalk displaced by the preceding spacing arm to its new position. It will therefore be apparent, that each time the mutilated gear member 114 is rotated by its limited amount, the rack member 134 will be reciprocated through the connecting link 132 in order to impart a single spacing movement to the respective stalks engaged by the spacing arms 140. This reciprocatory movement of the rack is imparted each time a stalk passes the rearwardmost retractible device 62 in order to synchronize initiation of the spacing movements with the reception of stalks on the stick 48.

Drive of the intermittent gear assembly 104 to impart the aforementioned spacing movement to the spacing mechanism, is synchronized by timely displacement of the mutilated gear member 114 by the pawl element 116. It will be observed that the lock bar 66 associated with the rearmost retractible device 62 is pivotally connected by the link 146 to an actuating lever arm 148 secured to one end of an elongated actuating shaft 150 rotatably mounted by the frame assembly. Connected to the rear end of the actuating shaft 150 is a cam member 152 as will be clearly seen in FIGURE 6. A follower member 154 is biased by the spring 156 into engagement with the cam element 152 and is connected to the pawl element 116. Accordingly, when the locking bar 66 is retracted by passage of a stalk between the cam members 74, the actuating shaft 150 will angularly displace the cam element 152 to displace the pawl element 116 by an amount sufficient to bring a gear tooth on the mutilated gear member 114 into meshing engagement with the teeth on the continuously rotated gear member 112. The mutilated gear member 114 is then rotated by a sufficient amount to impart reciprocatory movement to the rack member 134 and incremental movement to the conveyor assembly 28. After the spacing mechanism 80 is thereby operative to impart spacing movement to the stalks six times, the stick 30 will be fully loaded while at the same time, the intermittently operated conveyor assembly will bring the hook elements 50 under the loaded stick 30 so that the loaded stick may be removed from its position between the spear member 56 and the cup member 52.

From the foregoing description, the construction and operation of the tobacco harvesting machine will be apparent. It will therefore be recalled that as the machine is towed in a forward direction parallel to a row of crops, the stalks of the tobacco plants will be impaled on the spear member 56 firmly held in position by at least one of the retractible devices 58, 60 and 62 which also permit passage of the impaled stalks toward the stick 30 which extends rearwardly from the spear member when in an operative position. As the impaled stalks pass on to the stick 30, they are severed by the continuously rotated cutter blade 82. Also, the drive shaft 86 through which the saw blade 82 is continuously rotated, operates the intermittent gear assembly 104. Each time a stalk passes the rearwardmost retractible device 62, angular displacement is imparted to the actuating shaft 150 in order to bring a gear tooth on the mutilated gear member 114 into meshing relation with the continuously rotated gear member 112 of the intermittent gear assembly. A predetermined amount of rotation of the mutilated gear member 114 ensues so as to transmit spacing movement to the stalks on the stick through the spacing mechanism 80 and at the same time impart incremental movement to the conveyor assembly 28. Accordingly, the stalks are spaced six times rearwardly along the holder stick 30 after which the loaded stick is removed from its operative position in view of the incremental advancement of the lifting projections 50 under the stick 30 to subsequently carry the loaded stalk holder stick upwardly along the upper run of the conveyor assembly. As the plant stalks are being rearwardly displaced along the stick 30 by the spacing arms, they are also pressed laterally against the upper run of the conveyor by means of the guide bar 158 as more clearly seen in FIGURES 1 and 4. Accordingly, as the plants carried on the loaded sticks 48 are conveyed upwardly by the conveyor assembly, they will not interfere with the placement of a new stick into operative position by an operator on the machine platform.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for harvesting plants having vertical stalks growing in a row comprising, a frame adapted to be towed in a direction parallel to said row, a spear positioned on said frame for impaling the stalks of said plants in response to forward movement of the frame in said direction, a plurality of retractible devices engageable with the spear for fixed positioning thereof on the frame, means responsive to engagement of said stalks impaled on the spear during said forward movement of the frame for sequentially retracting said devices to permit passage of the stalks along the spear, positioning means for receiving a stalk holder on the frame extending rearwardly from the spear, drive means mounted by the frame and rendered operative in response to said forward movement, spacing means operatively connected to the drive means and rendered operative to engage said stalks for transmitting spacing movement thereto along the stalk holder, synchronizing means responsive to movement of a stalk past said retractible devices for rendering the drive means operative to impart said spacing movement to the spacing means, and conveyor means simultaneously driven by the drive means for removing the stalk holder from the positioning means after a predetermined number of spacing movements have been imparted to the spacing means, whereby the stalk holder fully loaded with the stalks may be unloaded from the machine.

2. The combination of claim 1 wherein said drive means comprises, a drive shaft, intermittent gear means drivingly connecting said drive shaft to the conveyor means and the spacing means for imparting said spacing movement thereto, and means connected to said synchronizing means and engageable with the intermittent gear means for initiating said spacing movement and incremental advancement of the conveyor means.

3. The combination of claim 2 wherein each of said retractible devices comprises, a lock bar engageable with the spear to prevent axial movement thereof, a cam member pivotally mounted by the frame in the path of said stalks, and a follower element mounted on the lock bar in engagement with the cam member for retraction of the lock bar when the cam member is displaced by a stalk.

4. The combination of claim 3 wherein said synchronizing means comprises, actuating means connected to the lock bar of one of said retractible devices for displacement upon retraction thereof, and linkage means drivingly connecting said actuating means to the initiating means of the drive means.

5. The combination of claim 4 wherein said spacing means comprises, a reciprocable rack drivingly connected to said intermittent gear means of the drive means, a plurality of sector gears mounted by the frame means in meshing relation to the rack, a spacing arm pivotally connected to each of the sector gears and overlying the stalk holder, and means for limiting pivotal movement of the spacing arms relative to the sector gears in one direction to transmit movement to the stalks engaged by the spacing arms in a rearward direction along the stalk holder.

6. The combination of claim 1 wherein each of said retractible devices comprises, a lock bar engageable with the spear to prevent axial movement thereof, a cam member pivotally mounted by the frame in the path of said stalks, and a follower element mounted on the lock bar in engagement with the cam member for retraction of the lock bar when the cam member is displaced by a stalk.

7. The combination of claim 6 wherein said synchronizing means comprises, actuating means connected to the lock bar of one of said retractible devices for displacement upon retraction thereof, and linkage means drivingly connecting said actuating means to the initiating means of the drive means.

8. The combination of claim 1 wherein said spacing means comprises, a reciprocable rack drivingly connected to said drive means, a plurality of sector gears mounted by the frame means in meshing relation to the rack, a spacing arm pivotally connected to each of the sector gears and overlying the stalk holder, and means for limiting pivotal movement of the spacing arms relative to the sector gears in one direction to transmit movement to the stalks engaged by the spacing arms in a rearward direction along the stalk holder.

9. In a machine for harvesting plants having vertical stalks growing in a row comprising, a frame adapted to be towed in a direction parallel to said row, a spear positioned on said frame for impaling the stalks of said plants in response to forward movement of the frame in said direction, a plurality of retractible devices engageable with the spear for fixed positioning thereof on the frame, means responsive to engagement of said stalks impaled on the spear during said forward movement of the frame for sequentially retracting said devices to permit passage of the stalks along the spear, positioning means for receiving a stalk holder on the frame extending rearwardly from the spear, drive means mounted by the frame and rendered operative in response to said forward movement, spacing means operatively connected to the drive means and rendered operative to engage said stalks for transmitting spacing movement thereto, and synchronizing means connected to and responsive to movement of a stalk past said retractible devices for rendering the drive means operative to impart said spacing movement.

10. The combination of claim 9 wherein said drive means includes intermittent gear means drivingly connecting said drive shaft to the spacing means for imparting said spacing movement thereto, and means connected to said synchronizing means and engageable with the intermittent gear means for initiating said spacing movement.

11. The combination of claim 10 wherein said spacing means comprises, a reciprocable rack drivingly connected to said intermittent gear means of the drive means, a plurality of sector gears mounted by the frame means in meshing relation to the rack, a spacing arm pivotally connected to each of the sector gears, and means for limiting pivotal movement of the spacing arms relative to the sector gears in one direction to transmit movement to the stalks engaged by the spacing arms in a rearward direction.

12. In a machine for harvesting plants having vertical stalks growing in a row comprising, a frame adapted to be towed in a direction parallel to said row a spear positioned on said frame for impaling the stalks of said plants in response to forward movement of the frame in said direction, a plurality of retractible devices engageable with the spear for fixed positioning thereof on the frame, means responsive to engagement of said stalks impaled on the spear during said forward movement of the frame for sequentially retracting said devices to permit passage of the stalks along the spear, positioning means for receiving a stalk holder on the frame extending rearwardly from the spear, spacing means rendered operative to engage said stalks for transmitting spacing movement thereto along the stalk holder, synchronizing means responsive to movement of a stalk past said retractible devices for rendering the spacing means operative to impart said spacing movement to the stalks, and conveyor means simultaneously driven by the drive means for removing the stalk holder from the positioning means after a predetermined number of spacing movements have been imparted to the spacing means, whereby the stalk holder fully loaded with the stalks may be unloaded from the machine.

13. The combination of claim 12 wherein each of said retractible devices comprises, a lock bar engageable with the spear to prevent axial movement thereof, a cam member pivotally mounted by the frame in the path of said stalks, and a follower element mounted on the lock bar in engagement with the cam member for retraction of the lock bar when the cam member is displaced by a stalk.

References Cited

UNITED STATES PATENTS

| 1,090,747 | 3/1914 | Nunnelley et al. | 56—27.5 |
| 3,079,744 | 3/1963 | Newswanger | 56—27.5 |

ABRAHAM G. STONE, *Primary Examiner.*

RUSSELL R. KINSEY, *Examiner.*